(12) United States Patent
Rosenberg

(10) Patent No.: US 9,825,734 B2
(45) Date of Patent: Nov. 21, 2017

(54) VOIP SYSTEM

(71) Applicant: Cisco Technology, Inc., San Jose, CA (US)

(72) Inventor: Jonathan Rosenberg, Freehold, NJ (US)

(73) Assignee: Cisco Technology, Inc., San Jose, CA (US)

( * ) Notice: Subject to any disclaimer, the term of this patent is extended or adjusted under 35 U.S.C. 154(b) by 79 days.

(21) Appl. No.: 14/572,795

(22) Filed: Dec. 17, 2014

(65) Prior Publication Data
US 2016/0182191 A1    Jun. 23, 2016

(51) Int. Cl.
*H04L 1/08* (2006.01)
*H04M 7/00* (2006.01)
*H04L 29/06* (2006.01)

(52) U.S. Cl.
CPC ............ *H04L 1/08* (2013.01); *H04L 65/1083* (2013.01); *H04L 65/80* (2013.01); *H04M 7/006* (2013.01); *H04M 7/0084* (2013.01); *H04M 2203/2088* (2013.01)

(58) Field of Classification Search
CPC ......... H04L 1/08; H04L 5/0053; H04L 5/003; H04L 43/0829; H04L 43/0823; H04L 43/08; H04L 61/1529; H04M 7/006
USPC ............. 370/392, 412, 352, 395.5, 241, 331
See application file for complete search history.

(56) References Cited

U.S. PATENT DOCUMENTS

| | | |
|---|---|---|
| 7,024,162 B2 | 4/2006 | Muthuswamy et al. |
| 7,099,280 B1 | 8/2006 | Shaffer et al. |
| 7,587,028 B1 | 9/2009 | Broerman et al. |
| 8,218,458 B2 | 7/2012 | Flynn et al. |
| 8,245,266 B2 | 8/2012 | Jefremov et al. |
| 8,626,496 B2 | 1/2014 | Toebes |
| 8,670,336 B2 | 3/2014 | Velenko et al. |

(Continued)

FOREIGN PATENT DOCUMENTS

| | | |
|---|---|---|
| EP | 001309211 B1 | 5/2007 |
| WO | WO 01/10152 | 2/2001 |

OTHER PUBLICATIONS ip.com: Signal Strength Presence Status. IP.Com Disclosure Number: IPCOM000238147D; Publication date: Aug. 5, 2014.

(Continued)

*Primary Examiner* — Kwang B Yao
*Assistant Examiner* — Syed M Bokhari
(74) *Attorney, Agent, or Firm* — Samuel M. Katz

(57) ABSTRACT

In one embodiment, a device for participating in a voice over Internet Protocol (VOIP) communication with another device includes a processor and a communication interface, wherein the processor is operative to prepare VOIP packets for sending to the other device via the communication interface as part of the VOIP communication, the communication interface is operative to send the VOIP packets to the other device, and the processor is operative to receive an indication of a communication problem related to the transfer of at least some of the VOIP packets to the other device, based on receiving the indication of the communication problem, output a notification indicating that voice input should cease, and cease transmission of other one of the VOIP packets until receiving an indication that the communication problem has been resolved. Related apparatus and methods are also described.

14 Claims, 7 Drawing Sheets

(56) References Cited

U.S. PATENT DOCUMENTS

| | | | |
|---|---|---|---|
| 8,718,244 B2 | 5/2014 | Katis et al. | |
| 2004/0196826 A1* | 10/2004 | Bao | H04L 29/06027 370/352 |
| 2005/0105471 A1* | 5/2005 | Ido | H04L 47/263 370/241 |
| 2006/0020697 A1 | 1/2006 | Kelso et al. | |
| 2006/0088036 A1* | 4/2006 | De Prezzo | H04L 12/465 370/395.53 |
| 2006/0268828 A1* | 11/2006 | Yarlagadda | H04M 7/006 370/352 |
| 2009/0168978 A1 | 7/2009 | Laws et al. | |
| 2012/0257527 A1* | 10/2012 | Jorgensen | H04L 1/20 370/252 |
| 2013/0165085 A1 | 6/2013 | Krinsky et al. | |
| 2013/0217364 A1 | 8/2013 | Varoglu et al. | |
| 2013/0222419 A1* | 8/2013 | Rosenberg | H04N 7/147 345/629 |
| 2014/0161135 A1* | 6/2014 | Acharya | H04L 47/263 370/412 |
| 2015/0382280 A1* | 12/2015 | Gray | H04W 8/30 370/331 |
| 2016/0182191 A1* | 6/2016 | Rosenberg | H04L 1/08 370/392 |

OTHER PUBLICATIONS

Skype: How Do I Check My Call Quality Setting?; Copyright 2014 Skype and/or Microsoft. Can be seen at: https://support.skype.com/en/faq/FA900/how-do-i-check-my-call-quality-settings.

Inside Sales Com—Call Quality Log Utility; Copyright 2004-2014. Can be seen at: http://community.insidesales.com/sf/advancedtraining/admin/dialerbasics/callqualitylogutility.

Heard App—Capture the Moments You Would Otherwise Miss. Can be seen at: http://www.heardapp.com/.

Adtran Configuration Guide 2010: Configuring Voice Quality Monitoring in AOS. Copyright Sep. 2010.

Acrobat Connect Pro User Community: Best Practices for Using Connect Pro VoIP. Toesca, Vincent. Mar. 2009. Can be seen at: http://www.connectusers.com/tutorials/2009/03/voip_best_practices/.

* cited by examiner

VOIP SYSTEM

TECHNICAL FIELD

The present disclosure generally relates to a VOIP system.

BACKGROUND

Voice over IP (VoIP) is a methodology and group of technologies for the delivery of voice communications and multimedia sessions over Internet Protocol (IP) networks, such as the Internet. Other terms commonly associated with VoIP are IP telephony, Internet telephony, broadband telephony, and broadband phone service.

Network issues and/or device failures may disrupt VOIP communications thereby contributing to a great deal of user frustration. For example, a user participating in a VOIP communication may be speaking to one or more people who cannot hear parts of the conversation due to VOIP disruptions and parts of the conversation are missed completely.

BRIEF DESCRIPTION OF THE DRAWINGS

The present disclosure will be understood and appreciated more fully from the following detailed description, taken in conjunction with the drawings in which.

DESCRIPTION OF EXAMPLE EMBODIMENTS

Overview

There is provided in accordance with an embodiment of the present invention a device for participating in a voice over Internet Protocol (VOIP) communication with another device, the device including a processor and a communication interface, wherein the processor is operative to prepare VOIP packets for sending to the other device via the communication interface as part of the VOIP communication, the communication interface is operative to send the VOIP packets to the other device, and the processor is operative to receive an indication of a communication problem related to the transfer of at least some of the VOIP packets to the other device, based on receiving the indication of the communication problem, output a notification indicating that voice input should cease, and cease transmission of other ones of the VOIP packets until receiving an indication that the communication problem has been resolved.

Description Continued

Figure 1:
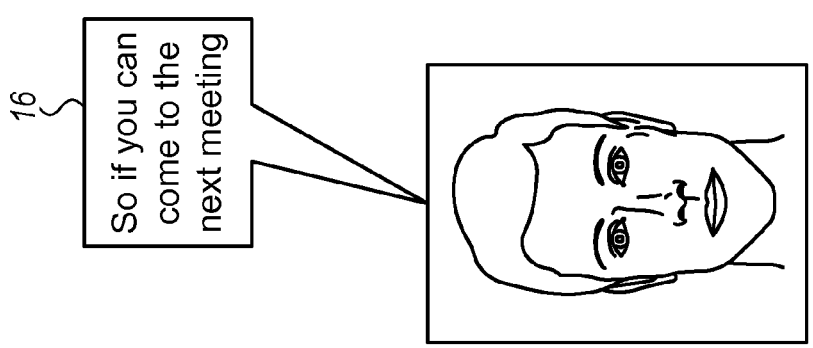
FIG. 1 is a pictorial view illustrating a voice over IP (VOIP) communication in a communication system constructed and operative in accordance with an embodiment of the present invention.
Figure 1:
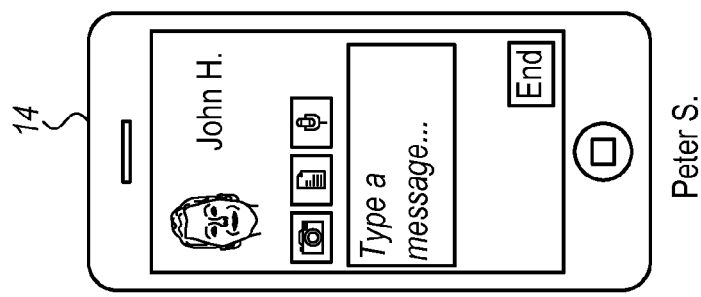
Figure 1:
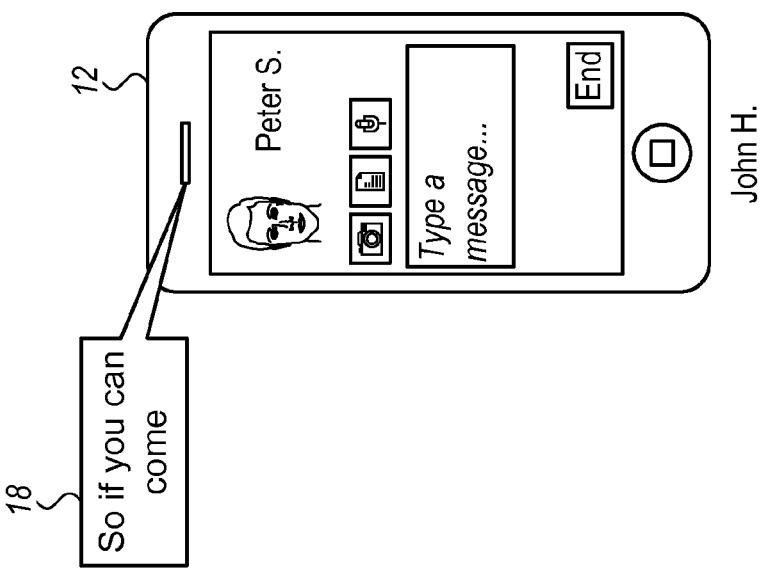

Reference is now made to FIG. 1, which is a pictorial view illustrating a voice over IP (VOIP) communication in a communication system 10 constructed and operative in accordance with an embodiment of the present invention.

John H. initiated a VOIP communication using his smart phone 12 with Peter S. who accepted the call on his smart phone 14. The VOIP communication may be a 1-1 call or a conference call, for example, made as part of a WebEx web conference.

They begin a conversation discussing a future meeting. Peter S. is speaking and all his words can be heard by John H.

Peter S. continues the conversation saying "so if you can come to the next meeting" (block 16) and John H. only hears the first part of the sentence "so if you can come" (block 18) as his smart phone 12 has not yet received the rest of the sentence. The reason for the lack of reception of the last words of the sentence by the smart phone 12 may be due to a network issue or a device failure, for example, but not limited to, a low or drained battery which is supposed to be powering the smart phone 12.

Figure 2:
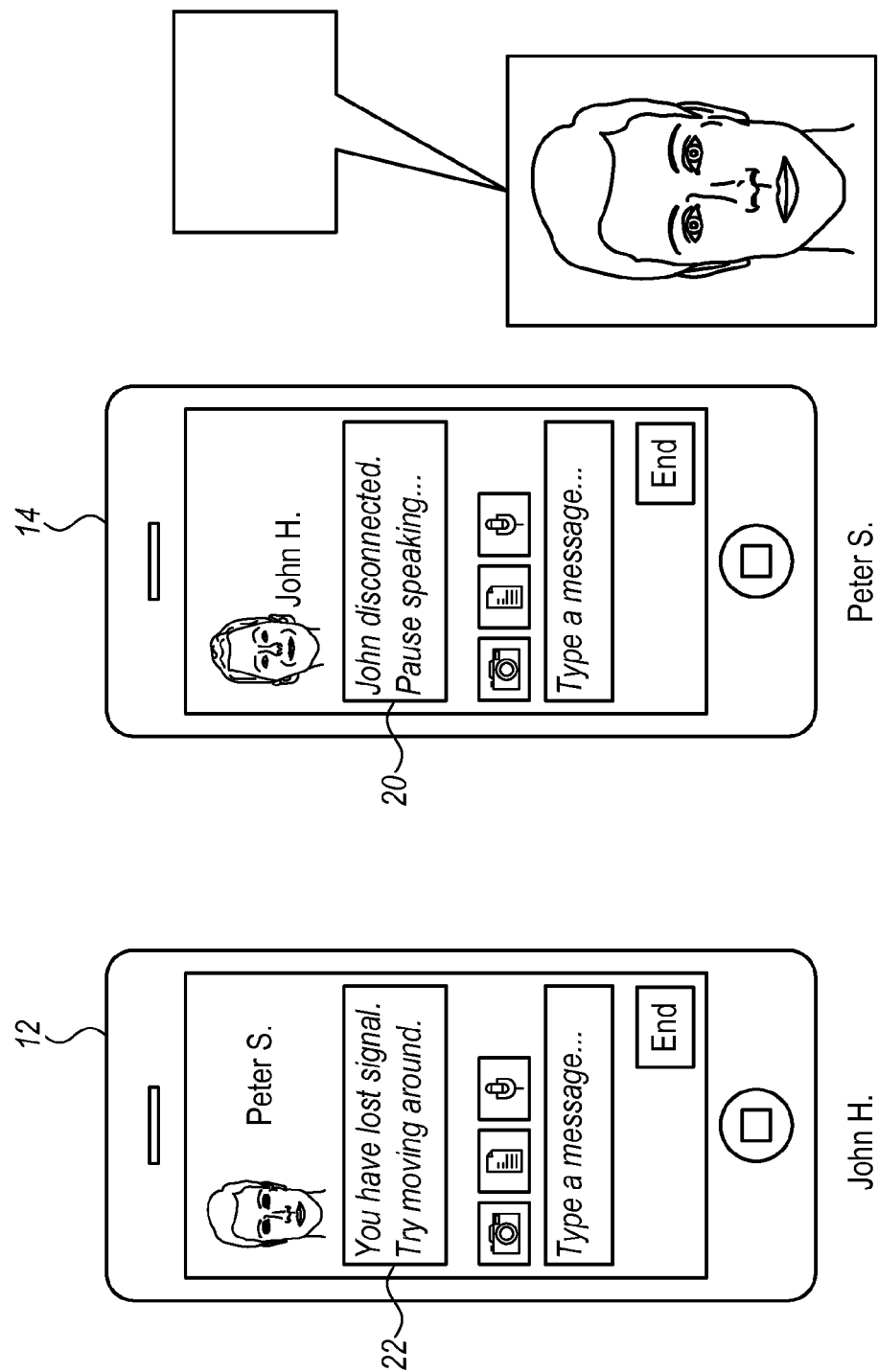
FIG. 2 is a pictorial view illustrating processing during a disconnection of the VOIP communication of FIG. 1.

Reference is now made to FIG. 2, which is a pictorial view illustrating processing during a disconnection of the VOIP communication of FIG. 1.

Due to a problem with the connection such as, a lost signal or a low battery, or other network disruption, such as packet loss, the VOIP communication is temporarily disconnected. The smart phone 14 detects that the communication has been disconnected and displays a notification which reads "John disconnected. Pause speaking" (block 20). Peter stops speaking. The smart phone 12 detects that the communication has been disconnected, in this case due to lost signal and displays a notification which reads "You have lost signal. Try moving around" (block 22). If the problem is due to a low battery then Peter could be informed by John's smart phone 12 that his battery is low in advance of the communication failing, thereby giving Peter some more warning of the future disconnection. In addition to, or instead of, the displayed notification indicating that speaking should be paused, an audible sound (for example, a buzzer, beep and/or a voice over with a suitable message such as "John disconnected. Pause speaking") and/or a vibration may be used to indicate to the user to pause speaking.

Figure 3:
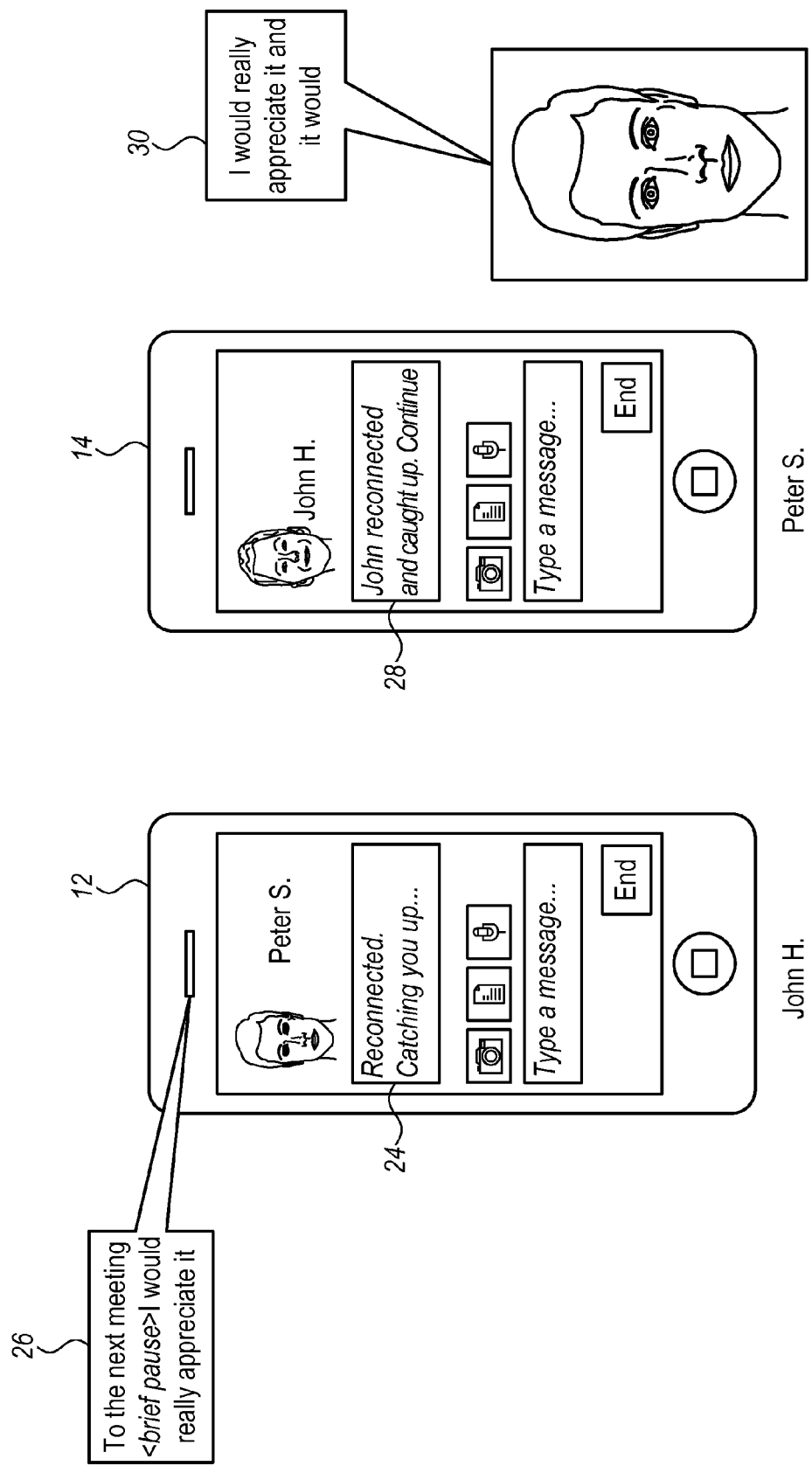
FIG. 3 is a pictorial view of illustrating processing after a reconnection of the VOIP communication of FIG. 1.

Reference is now made to FIG. 3, which is a pictorial view of illustrating processing after a reconnection of the VOIP communication of FIG. 1.

John moves around and the connection improves. If the disconnection was due to a low battery John may replace his battery or alternatively log in to the call via someone else's smart phone. John receives rapid catch up of undelivered voice input, up to where Peter was told to pause. John's smart phone 12 displays the notification which reads "Reconnected. Catching you up . . . " (block 24). John's smart phone 12 catches John up with the missed voice input, typically faster than real-time, for example, at around 1.5× speed, and John hears Peter's voice saying, "to the next meeting" (block 26). Peter's smart phone 14 displays the notification, "John reconnected and caught up. Continue." (block 28). In addition to, or instead of, the displayed notification indicating that speaking may continue, an audible sound (for example, a buzzer, beep and/or a voice over with a suitable notification such as "John reconnected and caught up. Continue.") and/or a vibration may be used to indicate to the user to continue speaking. New voice input from Peter (block 30) is transmitted and received by the smart phone 12 heard by John (block 26). The displayed notifications 24, 28 disappear on each of the phones 12, 14 after a short delay or when voice input and/or output is detected by the smart phones 12, 14. The VOIP communication now continues until it is complete or until another disruption occurs.

Figure 4:
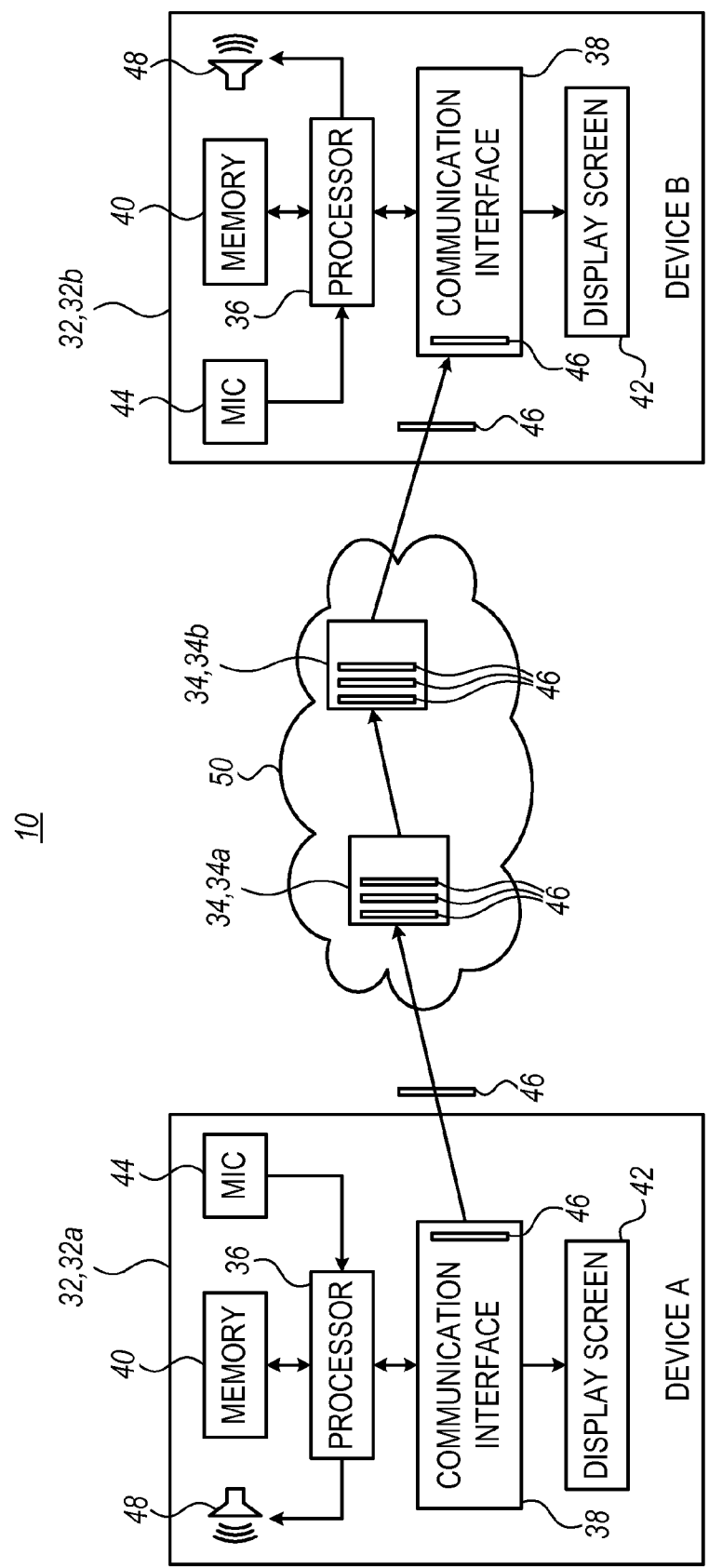
FIG. 4 is a more detailed block diagram view of the communication system of FIG. 1 showing a VOIP communication in progress.

Reference is now made to FIG. 4 is a more detailed block diagram view of the communication system 10 of FIG. 1 showing a VOIP communication in progress.

FIG. 4 shows a VOIP communication (call) taking place between two client devices 32. One of the client devices 32 is also labeled 32a and another one of the client devices 32 is also labeled 32b.

Each device 32 is operative to participate in a voice over Internet Protocol (VOIP) communication with the other device 32. Each device 32 includes a processor 36, a communication interface 38, a memory 40, a display screen 42, a microphone 44 or other voice input device and a speaker 48.

Each device 32 may be a mobile device (such as a smart phone) or a non-mobile device such as a desk phone or desk top computer by way of example only. The display screen 42, the microphone 44 and/or the speaker 48 may be integrated with the device 32 or removably attached to the device 32.

The processor 36 is operative to prepare VOIP packets 46 (for example real-time transport protocol (RTP) packets) for sending to the other device via the communication interface 38 as part of the VOIP communication. The processor 36 is also operative to process receive packets for rendering to the speaker 48. The communication interface is operative to send the VOIP packets 46 to the other device as well as receive VOIP packets from the other device.

The state of the VOIP call may be maintained in the cloud 50 or on a suitable remote server. The state of the call typically includes the users, media types, allocated media servers in the call. Each client device 32 connects to its own buffer server 34 in the cloud 50. The device 32a connects to its buffer server 34a and the device 32b connects to its buffer server 34b. The devices 32 may connect to their own buffer server 34 through communications establishment protocols such as Session Initiation Protocol (SIP) or through Hypertext Transfer Protocol (HTTP) based Application Program Interfaces (APIs).

In the example of FIG. 4, the VOIP packets 46 are sent from the communication interface 38 of the device 32a to the buffer server 34a. The VOIP packets 46 are then sent from the buffer server 34a to the buffer server 34b, possibly via one or more other intervening buffer servers (not shown). The VOIP packets 46 are then sent from the buffer server 34b for receipt by the communication interface 38 of the device 32b.

The communication interface 38 of the device 32a retains each packet 46 until the packet 46 is confirmed as received by the buffer server 34a. Similarly, buffer 34a retains the packet 46 until the packet 46 is confirmed as received by the next buffer in line (e.g.: the buffer server 34b) and so on for all the buffer servers on the route between the device 32a and the device 32b. The buffer server 34b retains each packet 46 until the packet 46 is confirmed as received by the device 32b. When an ack (acknowledgment) and nack (negative-acknowledgment) protocol is employed, each node (the device 32a or buffer servers 34) acks and nacks towards the upstream sender (the device 32 in the example of FIG. 4). Each node may retransmit the packet 46 it is retaining on a nack. Retransmissions may piggy back onto subsequent packets 46 or be sent as separate packets. Acks and nacks may be sent as RTP header extensions in RTP packets by way of example only. Increasing jitter buffers in the devices 32a, 32b may reduce the duration of sustained packet losses over which the system 10 may operate.

Therefore, the communications interface 38 is operative to: store each sent VOIP packet 46 until the communications interface 38 receives an acknowledgement of receipt for that sent VOIP packet 46; and upon receipt of a negative acknowledgement of any sent VOIP packet 46, retransmit that VOIP packet 46. The above is similarly applied to all the buffers 34 between the communication interfaces 38 of each device 32.

The communication system 10 may also based on a peer-to-peer type system where the buffer server 34 of each device 32 are integrated within each device 32.

The communication system 10 may also be based on a single buffer system where there is a single buffer server 34 that is shared between each device 32.

Figure 5:
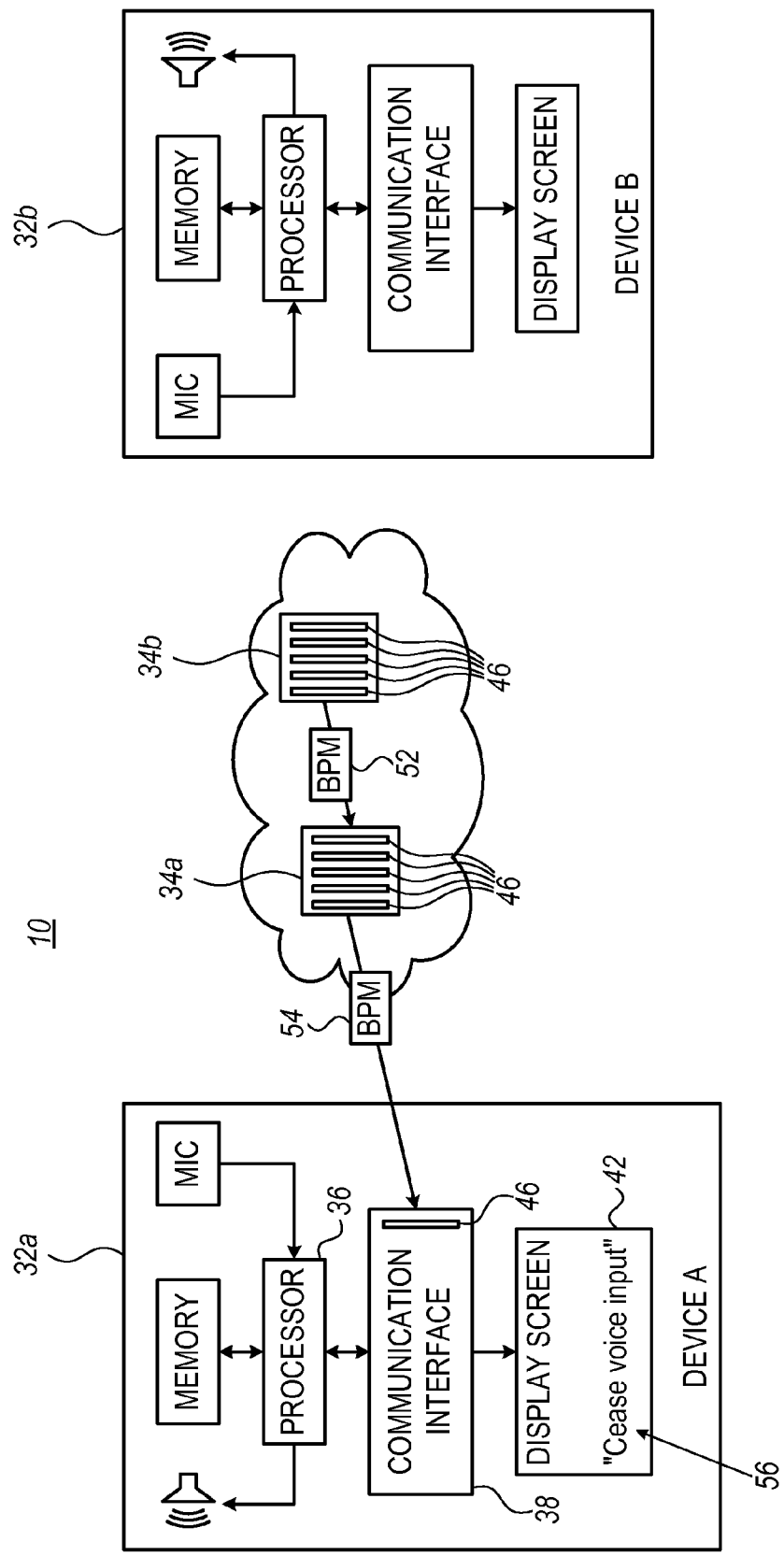
FIG. 5 is a more detailed block diagram view of the communication system of FIG. 1 showing the VOIP communication of FIG. 4 during a disconnection.

Reference is now made to FIG. 5, which is a more detailed block diagram view of the communication system 10 of FIG. 1 showing the VOIP communication of FIG. 4 during a disconnection.

The processor 36 of the device 32a is operative to receive an indication of a communication problem related to the transfer of at least some of the VOIP packets 46 to the device 32b. The communication problem may be that at least some of the VOIP packets 46 have not been received by the device 32b.

The processor 36 of the device 32a is operative to receive a backpressure message (BPM) 54 from the buffer server 34b as will be described in more detail below. The backpressure message 54 is indicative of the communication problem related to the transfer of at least some VOIP packets 46 to the device 32b via the buffer server 34a.

When there is high packet loss between the buffer server 34b and the device 32b, the buffer server 34b ceases receiving nacks and acks from the device 32b. The buffer server 34b fills up with the VOIP packets 46 and hits a threshold and sends a backpressure message 52 towards the buffer server 34a. The buffer server 34a stops sending the VOIP packets 46 to the buffer server 34b. The buffer server 34a in turn fills up with the VOIP packets 46 and sends its own back pressure message 54 to the device 32a once the buffer server 34a has reached its own threshold.

Based on receiving the indication of the communication problem (e.g.: the back pressure message 54), the processor 36 of the device 32a is operative to output a notification 56 for display (and/or playback, i.e. an audio notification or output another audio and/or tactile notification), the notification indicating that voice input should cease. The display screen 42 is operative to receive the notification 56 indicating that voice input should cease based on the indication of the communication problem related to the transfer of at least some VOIP packets 46 to the device 32b. The display screen 42 of the device 32a is operative to display the notification 56 indicating that voice input should cease.

The processor 36 of the device 32a is operative to cease transmission of other VOIP packet(s) 46 until receiving an indication that the communication problem has been resolved, for example, there is an indication that at least some of the VOIP packets 46 are now being received by the device 32b. By ceasing transmission of further packets, the system buffers (for example, the buffers 34) do not grow further, providing a maximum upper bound on the amount of time it takes to catch up once communications are restored.

The processor 36 of the device 32a is operative to cease transmission of other VOIP packet(s) 46 by instructing the communication interface 38 to cease transmission of the VOIP packet(s) 46.

Figure 6:
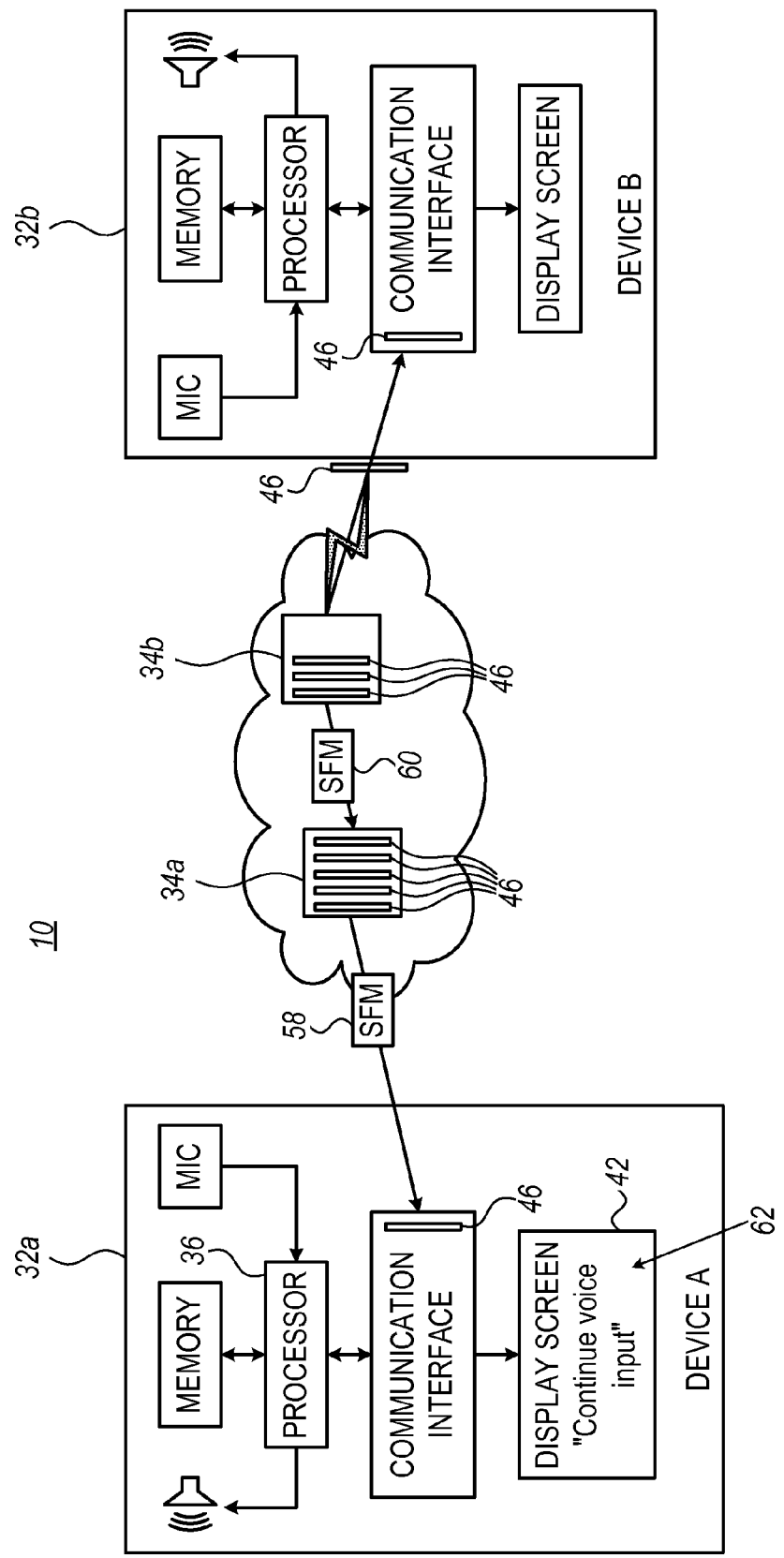
FIG. 6 is a more detailed block diagram view of the communication system of FIG. 1 showing the VOIP communication of FIG. 4 after reconnection.

Reference is now made to FIG. 6, which is a more detailed block diagram view of the communication system 10 of FIG. 1 showing the VOIP communication of FIG. 4 after reconnection.

The processor 36 of the device 32a is operative to receive an indication that the communication problem related to the transfer of at least some of the VOIP packets 46 to the device 32b has been resolved.

The processor 36 of the device 32a is operative to receive a start flow message (SFM) 60 from buffer server 34a. The start flow message 60 is indicative of the communication problem related to the transfer of the at least some VOIP packets 46 to the device 34b via the buffer server 34a being resolved.

Based on receiving the indication that the communication problem has been resolved, the processor 36 of the device 32a is operative to output a notification 62 for display (and/or playback, i.e. an audio notification or output another audio and/or tactile notification) indicating that voice input can continue. The display screen 42 is operative to: receive the notification 62 indicating that voice input can continue based on the indication that the communication problem related to the transfer of at least some of the VOIP packets 46 to the other device 32b has been resolved; and display the notification 62 indicating that voice input can continue.

In more detail, the buffer server 34b sends proactive packets 46 in order to determine when the connection problem between the buffer server 34b and the device 32b has been resolved. When the device 32b starts receiving the VOIP packets 46 again it sends acks to the buffer server 34b. The buffer server 34b, having a large queue of backed up VOIP packets 46, begins to rapidly transmit the contents of its buffer towards the device 32b, typically at a rate faster than real-time. The device 32b receives the previously backed-up packets 46, and in turn plays out the received VOIP packets 46 at an accelerated rate in order to catch up the user. Once the buffer server 34b has reduced its backlog of packets below a certain threshold, the buffer server 34b sends a start flow message 58 towards the buffer server 34a which in turn begins to deliver its VOIP packets 46 towards the buffer server 34b. As the buffer server 34a clears down its backlog below a certain threshold, the buffer server 34a sends the start flow message 60 towards the device 32a.

It can be seen from the above that as long as the talker does not speak while they are told to pause, each word that is spoken by the talker is eventually delivered and played out to the recipient, regardless of the packet loss in the network. The amount of time the recipient needs to wait varies, and it varies in proportion to the packet loss and the duration over which it persists.

The communication system 10 may be extended into multi-party conferences where a cloud buffer holds RTP packets until the cloud buffer receives an ack from each of the recipient buffers. Consequently, backpressure will be applied if any of the receivers cannot hear. The system 10 may be configured, for example using logic in a central buffer for the conference, such that backpressure is only applied when N of M receivers have not received the content, or when selected recipients (e.g., the boss) have not received it.

It should be noted that the various notifications described hereinabove as being output for display could also be output as voice notifications and/or other audible notifications such as a beep or buzz or a tactile notification using vibration instead of, or in addition to, displaying the visual notification.

Figure 7:
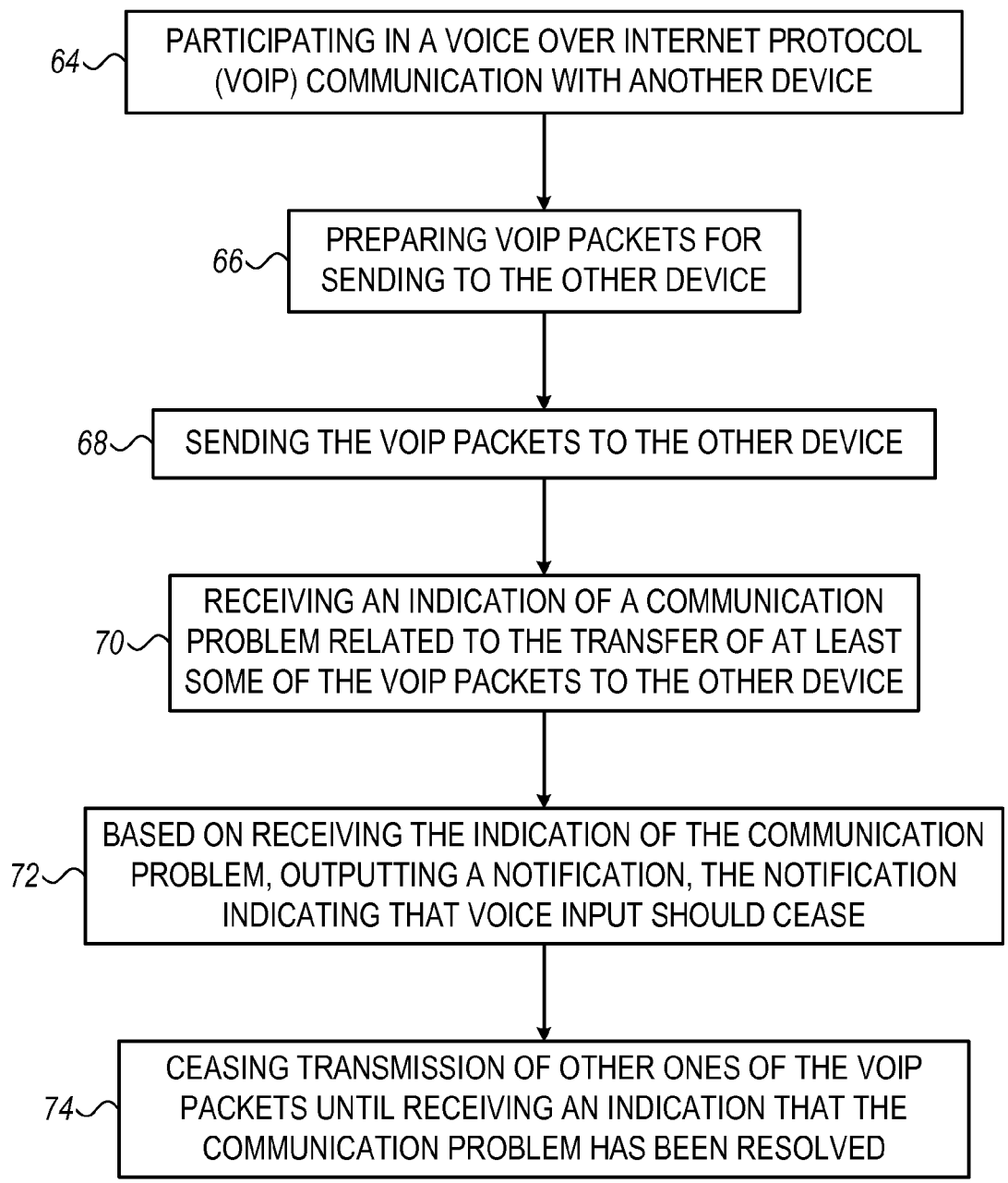
FIG. 7 is a flow chart showing steps in a method of operation of the communication system of FIG. 1.

Reference is now made to FIG. 7, which is a flow chart showing steps in a method of operation of the communication system 10 of FIG. 1.

The method typically includes the following steps:

(a) participating in a voice over Internet Protocol (VOIP) communication with another device (block 64);

(b) preparing VOIP packets for sending to the other device (block 66);

(c) sending the VOIP packets to the other device (block 68);

(d) receiving an indication of a communication problem related to the transfer of at least some of the VOIP packets to the other device (block 70);

(e) based on receiving the indication of the communication problem, outputting a notification, the notification indicating that voice input should cease (block 72); and (f) ceasing transmission of other one or ones of the VOIP packets until receiving an indication that the communication problem has been resolved (block 74).

In practice, some or all of these functions may be combined in a single physical component or, alternatively, implemented using multiple physical components. These physical components may comprise hard-wired or programmable devices, or a combination of the two. In some embodiments, at least some of the functions of the processing circuitry may be carried out by a programmable processor under the control of suitable software. This software may be downloaded to a device in electronic form, over a network, for example. Alternatively or additionally, the software may be stored in tangible, non-transitory computer-readable storage media, such as optical, magnetic, or electronic memory.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It will be appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

It will be appreciated by persons skilled in the art that the present invention is not limited by what has been particularly shown and described hereinabove. Rather the scope of the invention is defined by the appended claims and equivalents thereof.

What is claimed is:

1. A device for participating in a voice over Internet Protocol (VOIP) communication with another device via a buffer server external to the device, the device comprising a processor and a communication interface, wherein: the processor is operative to prepare VOIP packets for sending to the other device via the communication interface and the buffer server as part of the VOIP communication; the communication interface is operative to send the VOIP packets to the other device via the buffer server, which is operative to fill up, and when the buffer server reaches a first threshold, the buffer server is operative to send a first indication to the device; and the processor is operative to: receive, from the buffer server, the first indication of a communication problem related to the transfer of at least some of the VOIP packets to the other device; based on receiving the first indication of the communication problem from the buffer server, output a first notification indicating that voice input should cease, the first notification including one or more of the following: a visual notification; a voice notification; an audible notification; and a tactile notification; cease transmission of other ones of the VOIP packets until receiving second indication from the buffer server that the communication problem has been resolved, the buffer server being operative to send the second indication to the device once a backlog of packets is reduced below a second threshold; receive the second indication from the buffer server that the communication problem has been resolved; and based on receiving the second indication from the buffer server that the communication problem has been resolved, output a second notification indicating that voice input can continue, the second notification including one or more of the following: a visual notification; a voice notification; an audible notification; and a tactile notification.

2. The device according to claim 1, wherein the communication problem is that the at least some VOIP packets have not been received by the other device.

3. The device according to claim 1, wherein the processor is operative to receive a backpressure message from a buffer, the backpressure message being indicative of the communication problem related to the transfer of the at least some VOIP packets to the other device via the buffer.

4. The device according to claim 1, wherein the processor is operative to cease transmission of the other ones of the VOIP packets until receiving an indication that at least some of the VOIP packets are now being received by the other device.

5. The device according to claim 1, further comprising the display screen to display the first notification.

6. The device according to claim 1, wherein the processor is operative to receive a start flow message from a buffer, the start flow message being indicative of the communication problem related to the transfer of the at least some VOIP packets to the other device via the buffer being resolved.

7. The device according to claim 1, wherein the communications interface is operative to:
store each one of the sent VOIP packets until the communications interface receives an acknowledgement of receipt for the one sent VOIP packet; and
upon receipt of a negative acknowledgement of a first one of the sent VOIP packets, retransmit the first sent VOIP packet.

8. A method comprising: participating in a voice over Internet Protocol (VOIP) communication with a device via a buffer server external to the device; preparing VOIP packets for sending to the device; sending the VOIP packets to the device via the buffer server, which is operative to fill up, and when the buffer server reaches a first threshold, the buffer server is operative to send a first indication to the device; receiving, from the buffer server, the first indication of a communication problem related to the transfer of at least some of the VOIP packets to the device; based on receiving the first indication of the communication problem from the buffer server, outputting a first notification, the first notification indicating that voice input should cease, the first notification including one or more of the following: a visual notification; a voice notification; an audible notification; and a tactile notification; ceasing transmission of other ones of the VOIP packets until receiving second indication from the buffer server that the communication problem has been resolved, the buffer server being operative to send the second indication to the device once a backlog of packets is reduced below a second threshold; receiving a second indication from the buffer server that the communication problem has been resolved; and based on receiving the second indication from the buffer server that the communication problem has been resolved, outputting a second notification indicating that voice input can continue, the second notification including one or more of the following: a visual notification; a voice notification; an audible notification; and a tactile notification.

9. The method according to claim 8, wherein the communication problem is that the at least some VOIP packets have not been received by the device.

10. The method according to claim 8, further comprising receiving a backpressure message from a buffer, the backpressure message being indicative of the communication problem related to the transfer of the at least some VOIP packets to the device via the buffer.

11. The method according to claim 8, wherein the ceasing transmission of the other ones of the VOIP packets is in effect until receiving an indication that at least some of the VOIP packets are now being received by the device.

12. The method according to claim 8, further comprising displaying the first notification.

13. The method according to claim 8, further comprising receiving a start flow message from a buffer, the start flow message being indicative of the communication problem related to the transfer of the at least some VOIP packets to the device via the buffer being resolved.

14. The method according to claim 8, further comprising:
storing each one of the sent VOIP packets until receiving an acknowledgement of receipt for the one sent VOIP packet; and
upon receipt of a negative acknowledgement of a first one of the sent VOIP packets, retransmitting the first sent VOIP packet.

* * * * *